United States Patent [19]

Yoshino et al.

[11] Patent Number: 4,471,059

[45] Date of Patent: Sep. 11, 1984

[54] CARBON-CONTAINING REFRACTORY

[75] Inventors: Shigeo Yoshino, Bijen; Hideaki Nishio, Okayama; Issei Uchida, Bijen, all of Japan

[73] Assignee: Shinagawa Refractories Co., Ltd., Tokyo, Japan

[21] Appl. No.: 464,064

[22] Filed: Feb. 4, 1983

[51] Int. Cl.$^3$ ............................................. C04B 35/58
[52] U.S. Cl. ...................................... 501/96; 501/98; 501/99; 501/100; 501/101
[58] Field of Search ........................... 501/96, 99–101, 501/98

[56] References Cited

U.S. PATENT DOCUMENTS 4,306,030  12/1981  Watanabe et al. .................. 501/101

FOREIGN PATENT DOCUMENTS 660964  5/1979  U.S.S.R. ............................. 501/100

*Primary Examiner*—James Poer
*Attorney, Agent, or Firm*—Wenderoth, Lind & Ponack

[57] ABSTRACT

Carbon in the form of graphite is commonly used in refractories for metallurgical purposes because of its ability to increase resistance to corrosion. However, if the graphite in the refractory becomes oxidized, it greatly loses this ability. For this reason, it is very important for a refractory to have good resistance to oxidation, but there are at present no refractories fully satisfactory from the standpoints of resistance to oxidation and hot strength.

The present invention is a carbon-containing refractory having excellent resistance to oxidation and hot strength. These favorable properties are obtained by the addition in the refractory of both boron carbide and metal powder, the powder comprising at least one metal selected from Al, Si, Fe, and Ni.

5 Claims, No Drawings

CARBON-CONTAINING REFRACTORY

BACKGROUND OF THE INVENTION

The present invention relates to an improved type of carbon-containing refractory and more specifically to burned and unburned $Al_2O_3$—C, MgO—C, and MgO—$Al_2O_3$—C refractories having improved resistance to oxidation, spalling, and corrosion, in addition to improved hot strength.

Refractories containing carbon in the form of graphite are widely used in metallurgy. When in contact with molten iron, molten steel, or slag, these refractories exhibit excellent resistance to corrosion. Since graphite itself is resistant to wetting by slag, its presence in refractories prevents the penetration of slag into the refractories. Further, because of the presence of graphite, the refractories can not be over-sintered, and therefore thermal spalling does not readily occur. This, too, contributes to the high refractoriness of graphite-containing refractories.

However, graphite is very easily oxidized by oxygen in its surroundings, which causes a graphite-containing refractory to lose its excellent characteristics. In order to obtain a refractory with good characteristics, it is extremely important to decrease the oxidation of graphite. Various methods have been proposed of increasing the resistance to oxidation of this type of refractory, but at present no satisfactory method has been found.

Japanese Patent Laid Open No. 50-69106 disclosed covering the surface of a carbon-containing molded refractory material with a nitride or carbide of silicon and further coating it with a borosilicate glass comprising boron carbide and silicon dioxide in order to prevent oxidation. However, these covering layers are not resistant to attack by molten iron, molten steel, or slag, and if worn through by chemical attack will lose their anti-oxidizing effect. Accordingly, this method is not desirable.

Another method of preventing oxidation in carbon-containing refractories is to uniformly disperse metal powder in a carbon-containing molded refractory material. Japanese Patent Laid Open No. 55-107749 disclosed adding magnesium powder, aluminum powder, and silicon powder to carbon-containing refractory bricks, and Japanese Patent Laid Open No. 54-39422 disclosed adding to carbon-containing refractories a metal powder having a greater affinity for oxygen than carbon. In the latter invention, at least one type of metal powder selected from Al, Si, Cr, Ti, and Mg is added. However, the resistance to oxidation and the hot strength of the resulting carbon-containing refractory are not fully satisfactory.

SUMMARY OF THE INVENTION

It is the object of the present invention to overcome the drawbacks of carbon-containing refractories of the prior art and provide a carbon-containing refractory with excellent resistance to oxidation and hot strength. These properties are obtained by the addition of boron carbide and metal powders to the refractory, the metal powder comprising at least one metal selected from Al, Si, Fe, and Ni.

DESCRIPTION OF THE PREFERRED EMBODIMENTS

The carbon-containing refractory of the present invention comprises 3 to 30 parts by weight of graphite, 70 to 97 parts by weight of refractory raw materials, 1 to 7 parts by weight of metal powder, the metal powder comprising at least one metal selected from the group consisting of Al, Si, Fe and Ni, and 0.3 to 5 parts by weight of boron carbide.

It is not fully clear what is the bonding structure of the resulting refractory. However, it is thought that when the fine grains of the refractory raw material, the fine grains of graphite, the metallic powder, and the boron carbide are heated, the product of the reaction between the metallic powder and the boron carbide binds together the matrix part of brick which is constituted from fine grains of graphite and refractory raw materials. Further, it is thought that only a portion of the surface of the boron carbide powder is converted to boron oxide by oxygen contained in the pores of the refractory, promoting the sintering of the refractory and forming a compact, dense, and strong bonding structure. Aluminum metal has the drawback that it forms aluminum carbide ($Al_4C_3$) in the temperature range of 800°–1400° C. This aluminum carbide is undesirable because it is decomposed by water or by moisture in the air, causing the refractory to become brittle. However, after the refractory of the present invention was kept in a reducing atmosphere at 1500° C. for 3 hours, aluminum carbide was not identified by X-ray analysis. The combined presence in the refractory of boron carbide with the aluminum powder effectively prevents the formation of aluminum carbide. When only boron carbide was added to the refractory raw materials and graphite, without any metal powder, the hot strength and the strength after heating were low. Therefore, in the present invention, the metal powder and boron carbide are indispensable components.

When the surface of the refractory is exposed to molten metal, boron carbide is oxidized to form oxide. Boron oxide together with oxides of the metal powder and the refractory raw material form a melt of high viscosity which covers the surface of the refractory and prevents oxidation of the graphite.

The refractory raw materials employed in the present invention comprise oxides such as magnesia, spinel, alumina, silica, zircon, and zirconia, and non-oxides such as silicon carbide, silicon nitride, and boron nitride. There are no particular limits on the components, but it is desirable that the main components be magnesia, spinel, and alumina. The graphite may be a natural graphite such as amorpous graphite or crystalline graphite, or it may be an artificial graphite such as that derived from electrode scraps, oil coke, or carbon black. However, it is preferable to use crystalline graphite with few impurities. The relative proportion of graphite used depends upon the type of refractory raw materials used and the intended use for the refractory. However, it is generally preferable to employ 3–30 parts by weight of graphite per 100 parts by weight of the refractory aggregate consisting of graphite and refractory raw materials. If the amount of graphite in the aggregate is less than 3 parts by weight, the graphite will not exhibit good resistance to wetting by slag, in which case the entire refractory will have poor resistance to slag. Further, if the graphite exceeds 30 parts by weight, the desired strength cannot be obtained and it becomes difficult to obtain a compact structure constitution.

Commercial boron carbide abrasive material is satisfactory for use as the boron carbide in the refractory. In order to achieve good reactivity and uniform dispersion of the boron carbide, it is desirable that the grain size be at most 0.125 mm. Per 100 parts by weight of refractory aggregate, 0.3 to 5 parts by weight of boron carbide should be used. If less than 0.3 parts by weight of boron carbide are used, its addition has no effect. If it exceeds 5 parts by weight, the refractory exhibits resistance to oxidation, but its hot strength and durability decrease. As for the metal powder, it may comprise any desired metal selected from Al, Si, Cr, Ni, or it may comprise a mixture of more than one of these metals. The effects of Al are particularly excellent. Per 100 parts by weight of refractory aggregate, the amount of metal powder should be 1 to 7 parts by weight. If less than 1 part by weight is used, the addition of the metal powder produces no effect, and if more than 7 parts by weight are used, the resistance to corrosion of the refractory decreases.

The grain size-regulated refractory aggregate, boron carbide and metal powder are blended in the above described ratios. A binder such as tar, pitch, phenolic resin, or furan resin is added. Using conventional methods, this mixture is molded. After being dried at around 200° C., an unburned refractory is obtained. If it is instead burned at 900°–1500° C. in a reducing atmosphere, a burned refractory is obtained.

The following examples of a refractory according to the present invention illustrate the effects produced by various combinations of components.

EXAMPLE 1

80 parts by weight of magnesia, 20 parts by weight of graphite, 3 parts by weight of aluminum powder, 0.5 parts by weight of boron carbide, and 5 parts by weight of resol-type phenolic resin as a binder were blended together and then molded under a pressure of 1000 kg/cm$^2$ into standard bricks (230×114×65 mm) which were then dried at 200° C. for 5 hours. At 1400° C., the completed unburned bricks had a high hot modulus of rupture of 225 kg/cm$^2$. After oxidizing burning at 1000° C. for 3 hours, the bricks had a decrease in weight of only 2.8%.

EXAMPLE 2–5

Using the same method as used for Example 1, carbon-containing refractories having various compositions were prepared and formed into unburned standard bricks. The components and physical properties of these refractories according to the present invention are shown in Table 1.

COMPARATIVE EXAMPLES 1–3

For the purpose of comparison, three refractories having the compositions shown on the right side of Table 1 were blended and molded into standard bricks using the same method as was used in Example 1. Unlike the refractory of the present invention, they did not contain boron carbide and metal powder in combination. As can be seen from the table, these refractories had a much lower hot modulus of rupture and a much greater weight loss during burning at 1000° C. than does the present refractory, clearly illustrating the beneficial effect of the combination of boron carbide and metal powder.

TABLE 1

|  | Example | | | | | | | |
|---|---|---|---|---|---|---|---|---|
|  | The present invention | | | | | Comparative Ex. | | |
|  | 1 | 2 | 3 | 4 | 5 | 1 | 2 | 3 |
| magnesia | 80 | 60 |  |  | 80 | 80 | 80 | 80 |
| spinel |  | 30 | 20 |  |  |  |  |  |
| alumina |  |  | 60 | 85 |  |  |  |  |
| silicon carbide |  |  |  | 10 |  |  |  |  |
| graphite | 20 | 10 | 20 | 5 | 20 | 20 | 20 | 20 |
| metal Al | 3 | 3 |  |  | 3 |  |  | 3 |
| Si |  | 3 | 1 | 2 | 1 |  |  |  |
| boron carbide | 0.5 | 2 | 5 | 3 | 1 |  | 0.5 |  |
| *% weight loss after oxidation burning at 1000° C. for 3 hours | 2.8 | 1.5 | 1.3 | 1.9 | 3.1 | 12.0 | 7.1 | 9.3 |
| hot modulus of rupture (kg/cm$^2$, at 1400° C.) | 225 | 168 | 190 | 185 | 210 | 42 | 146 | 120 |

*This valve is the total % weight loss after 1000° C. burning minus the % weight loss due to vaporization of the binder.

What is claimed is:
1. A carbon-containing refractory consisting essentially of:
   3 to 30 parts by weight of graphite; 70 to 97 parts by weight of refractory raw materials; 1 to 7 parts by weight of a metal powder, said powder comprising at least one metal selected from the group consisting of aluminum, silicon, iron and nickel; and 0.3 to 5 parts by weight of boron carbide.
2. A carbon-refractory according to claim 1 in which the refractory raw materials are at least one member selected from the group consisting of magnesia, spinel, alumina, silica, zircon, zirconia, silicon carbide, silicon nitride and boron nitride.
3. A carbon refractory according to claim 1 in which the refractory raw materials are mainly composed of magnesia, spinel and alumina and the graphite is crystalline graphite.
4. A carbon refractory according to claim 1 wherein said refractory is an unburned refractory.
5. A carbon refractory according to claim 1 wherein said refractory is a burned refractory.

* * * * *